United States Patent
Kobayashi

(10) Patent No.: US 10,535,193 B2
(45) Date of Patent: Jan. 14, 2020

(54) IMAGE PROCESSING APPARATUS, IMAGE SYNTHESIZING APPARATUS, IMAGE PROCESSING SYSTEM, IMAGE PROCESSING METHOD, AND STORAGE MEDIUM

(71) Applicant: CANON KABUSHIKI KAISHA, Tokyo (JP)

(72) Inventor: Masaaki Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 15/256,956

(22) Filed: Sep. 6, 2016

(65) Prior Publication Data

US 2017/0069107 A1  Mar. 9, 2017

(30) Foreign Application Priority Data

Sep. 8, 2015 (JP) .................................. 2015-177095
Aug. 29, 2016 (JP) .................................. 2016-167289

(51) Int. Cl.
G09G 5/00 (2006.01)
G06T 19/00 (2011.01)
G06F 3/01 (2006.01)

(52) U.S. Cl.
CPC ............ G06T 19/006 (2013.01); G06F 3/011 (2013.01); *G06T 2207/30244* (2013.01)

(58) Field of Classification Search
CPC ....... G06T 19/006; G06T 19/00; G06F 3/011; G06F 3/012; G02B 27/017
USPC ...................................................... 345/633
See application file for complete search history.

(56) References Cited

U.S. PATENT DOCUMENTS

| 8,144,238 B2 * | 3/2012 | Kotake ................ G06K 9/3216 348/239 |
| 8,320,709 B2 * | 11/2012 | Aratani ................ G06K 9/3216 382/291 |
| 9,438,868 B2 * | 9/2016 | Boettiger ................. H04N 9/09 |
| 2005/0068314 A1 * | 3/2005 | Aso ........................ G06T 19/006 345/419 |

(Continued)

OTHER PUBLICATIONS

Maclaren, J., etc. Measurement and Correction of Microscopic Head Motion during Magnetic Resonance Imaging of the Brain, PLoS One. 2012;7(11):e48088. doi: 10.1371/journal.pone.0048088. Epub Nov. 7, 2012 [online], [retrieved on Feb. 12, 2018]. Retrieved from the Internet <URL: https://www.ncbi.nlm.nih.gov/pubmed/23144848>.*

(Continued)

*Primary Examiner* — Gordon G Liu
(74) *Attorney, Agent, or Firm* — Venable LLP

(57) ABSTRACT

There is provided with an image processing apparatus. A first image sensor outputs a first image. The first image sensor has a relatively small amount of image deterioration caused by a motion of an object. A second image sensor outputs a second image. The second image sensor has a relatively large amount of image deterioration caused by the motion of the object. An estimation unit analyzes the first image and generates position and orientation information of the image processing apparatus. A rendering unit renders a CG object on the second image such that the CG object is superimposed at a position determined based on the position and orientation information.

3 Claims, 10 Drawing Sheets

(56) References Cited

U.S. PATENT DOCUMENTS

| | | | |
|---|---|---|---|
| 2010/0027888 A1* | 2/2010 | Katano | G06T 19/00 |
| | | | 382/173 |
| 2010/0309340 A1* | 12/2010 | Border | H04N 5/335 |
| | | | 348/241 |
| 2012/0113228 A1* | 5/2012 | Konno | H04N 13/0452 |
| | | | 348/47 |
| 2013/0329068 A1 | 12/2013 | Hamanaka et al. | |
| 2015/0117539 A1 | 4/2015 | Kobayashi | |
| 2016/0026253 A1 | 1/2016 | Bradski et al. | |

OTHER PUBLICATIONS

Kato, Hirokazu and Billinghurst, Mark, "Marker Tracking and HMD Calibration for a Video-based Augmented Reality Conferencing System", 2nd IEEE and ACM International Workshop on Augmented Reality, 1999.

Klein, Georg and Murray, David, "Parallel Tracking and Mapping on a Camera Phone", International Symposium on Mixed and Augmented Reality, 2009.

Masayuki Kanbara, et al. "A Stereoscopic Video See-through Augmented Reality System Based on Real-time Vision-based Registration," Proc. IEEE Virtual Reality (2000), pp. 255-262.

\* cited by examiner

IMAGE PROCESSING APPARATUS, IMAGE SYNTHESIZING APPARATUS, IMAGE PROCESSING SYSTEM, IMAGE PROCESSING METHOD, AND STORAGE MEDIUM

BACKGROUND OF THE INVENTION

Field of the Invention

The present invention relates to an image processing apparatus, an image synthesizing apparatus, an image processing system, an image processing method, and a storage medium.

Description of the Related Art

In recent years, a technique, called "visual simultaneous localization and mapping (SLAM)", for estimating the three-dimensional position and orientation of a moving camera from a video captured by the camera has been put into practical use. The visual SLAM technique can be applied to mixed reality (MR) technology and augmented reality (AR) technology that display a three-dimensional computer graphics object, which is virtually present, on the video as a rendered image based on the position and orientation of the camera. The technique for estimating the position and orientation of the camera from a video can be divided into a method that uses a marker and a method that does not use a marker. Both methods estimate the position and orientation of a camera in a three-dimensional space by identifying a marker or a natural object between frames and following the motion of the marker or the natural object (hereinafter, this following operation will be referred to as "tracking"). A position/orientation estimation method that uses a marker is disclosed in Marker Tracking and HMD Calibration for a Video-based Augmented Reality Conferencing System, by Hirokazu Kato and Mark Billinghurst, in Proceedings of the 2nd IEEE and ACM International Workshop on Augmented Reality, 1999 (hereinafter referred to as Non-Patent Document 1). A position/orientation estimation method that does not use a marker is disclosed in Parallel Tracking and Mapping on a Camera Phone, by Georg Klein and David Murray, in Proceedings of the International Symposium on Mixed and Augmented Reality (ISMAR 2009, Orlando) (commonly known as PTAM) (hereinafter referred to as Non-Patent Document 2). According to the MR technology, a map, called "environmental map", is generated from the estimated position and orientation of a camera, the map indicating the three-dimensional position of a marker or an object. Then, by using the environmental map, the position and orientation of a CG object is determined and superimposed on an input video. Through the above steps, it is possible to obtain a video that shows the CG object as if it was present in the reality space. At this time, whether or not the CG object can be superimposed at the correct position depends on the tracking accuracy, and the tracking accuracy depends greatly on the characteristics of each frame image in the video.

The characteristics of a frame image depend on a sensor and the conditions for driving the sensor. In the case of using, for example, a rolling shutter sensor, which is commonly used in a CMOS sensor, a distortion called "rolling shutter distortion" occurs in situations where there is a moving object in the scene or where the camera is panned. This distortion reduces the accuracy of identifying the marker or the object between frames, as a result of which the tracking accuracy and the accuracy of position/orientation estimation are reduced. On the other hand, in the case of using a global shutter sensor as typified by a CCD, such a rolling shutter distortion does not occur. However, it is generally recognized that the global shutter sensor requires a high driving voltage and it is therefore difficult to achieve a high resolution and a high frame rate. Even with the rolling shutter sensor, by improving the driving speed of the sensor, the rolling shutter distortion can be reduced significantly.

SUMMARY OF THE INVENTION

According to an embodiment of the present invention, an image processing apparatus comprises: a first image sensor configured to output a first image, the first image sensor having a relatively small amount of image deterioration caused by a motion of an object; a second image sensor configured to output a second image, the second image sensor having a relatively large amount of image deterioration caused by the motion of the object; an estimation unit configured to analyze the first image and generate position and orientation information of the image processing apparatus; and a rendering unit configured to render a CG object on the second image such that the CG object is superimposed at a position determined based on the position and orientation information.

According to another embodiment of the present invention, an image synthesizing apparatus comprises: a first acquiring unit configured to receive a first image having a relatively small amount of image deterioration caused by a motion of an object from an image processing apparatus; a second acquiring unit configured to receive a second image having a relatively large amount of image deterioration caused by the motion of the object from the image processing apparatus; an estimation unit configured to analyze the first image and generate position and orientation information of the image processing apparatus; and a rendering unit configured to render a CG object on the second image such that the CG object is superimposed at a position determined based on the position and orientation information.

According to still another embodiment of the present invention, an image processing system comprises an image processing apparatus and an image synthesizing apparatus, the image processing apparatus comprising: a first image sensor configured to output a first image, the first image sensor having a relatively small amount of image deterioration caused by a motion of an object; a second image sensor configured to output a second image, the second image sensor having a relatively large amount of image deterioration caused by the motion of the object; and a transmission unit configured to transmit the first image and the second image to the image synthesizing apparatus, and the image synthesizing apparatus comprising: a first acquiring unit configured to receive the first image from the image processing apparatus; a second acquiring unit configured to receive the second image from the image processing apparatus; an estimation unit configured to analyze the first image and generate position and orientation information of the image processing apparatus; and a rendering unit configured to render a CG object on the second image such that the CG object is superimposed at a position determined based on the position and orientation information.

According to yet another embodiment of the present invention, an image processing method comprises: obtaining a first image captured by an image processing apparatus, the first image having a relatively small amount of image deterioration caused by a motion of an object; obtaining a second image captured by the image processing apparatus, the second image having a relatively large amount of image deterioration caused by the motion of the object; analyzing the first image and generating position and orientation information of the image processing apparatus; and rendering a CG object on the second image such that the CG object is superimposed at a position determined based on the position and orientation information.

According to still yet another embodiment of the present invention, an image processing method comprises: capturing, using a first image sensor of an image processing apparatus, a first image having a relatively small amount of image deterioration caused by a motion of an object; capturing, using a second image sensor of the image processing apparatus, a second image having a relatively large amount of image deterioration caused by the motion of the object; transmitting the first image and the second image from the image processing apparatus to an image synthesizing apparatus; analyzing the first image and generating position and orientation information of the image processing apparatus; and rendering a CG object on the second image such that the CG object is superimposed at a position determined based on the position and orientation information.

According to yet still another embodiment of the present invention, a non-transitory computer-readable medium stores a program for causing a computer to: obtain a first image captured by an image processing apparatus, the first image having a relatively small amount of image deterioration caused by a motion of an object; obtain a second image captured by the image processing apparatus, the second image having a relatively large amount of image deterioration caused by the motion of the object; analyze the first image and generating position and orientation information of the image processing apparatus; and render a CG object on the second image such that the CG object is superimposed at a position determined based on the position and orientation information.

Further features of the present invention will become apparent from the following description of exemplary embodiments (with reference to the attached drawings).

DESCRIPTION OF THE EMBODIMENTS

In an MR apparatus, a rolling shutter distortion occurs in a video captured with a rolling shutter sensor, which reduces the accuracy of position/orientation estimation. In the case of using a global shutter sensor, it is difficult to process images having a sufficient resolution or a high frame rate at a low cost.

Some embodiments of the present invention enable both highly accurate position/orientation estimation and the generation of high definition view images.

Embodiment 1

Figure 1:
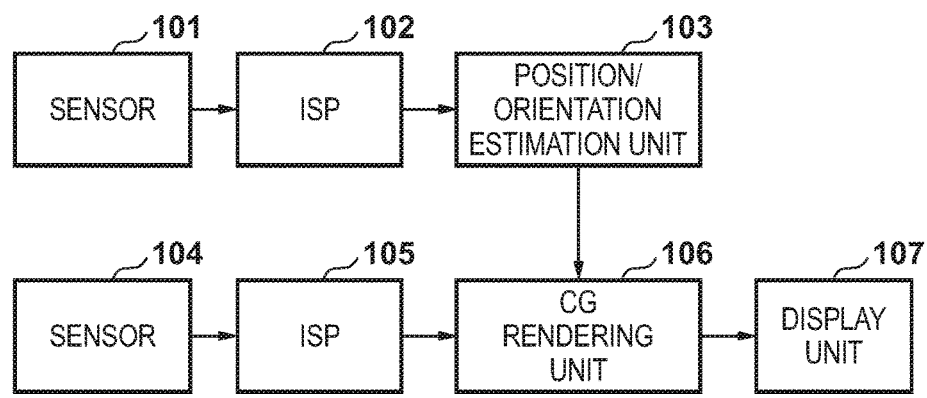
FIG. 1 is a diagram illustrating a MR apparatus configurations in Embodiment 1.

An MR apparatus 100, which is an image processing apparatus according to Embodiment 1 of the present invention, will be described. In the present embodiment, it is assumed that processing is executed on the MR apparatus including an imaging unit and a display unit. Hereinafter, a configuration of the MR apparatus and operations of modules will be described with reference to FIG. 1. FIG. 1 is a diagram illustrating a configuration of the MR apparatus (for example, a head mounted display) according to Embodiment 1.

A first sensor 101 captures a first image. In the present embodiment, the first sensor 101 is a global shutter sensor capable of capturing images, each of which is 960 pixels high and 540 pixels wide, at a speed of 60 fps. In the present embodiment, the sensor is connected to a lens unit, and thus is capable of capturing a video composed of sequential images to obtain a sensor signal. Note that the resolution and the frame rate are not limited to the above values.

A first image signal processor (ISP) 102 converts the sensor signal obtained by the first sensor 101 into an image. In the present embodiment, the first ISP 102 is a module having a function of outputting image data or an encoded stream obtained by encoding image data. To be specific, the first ISP 102 has multiple image processing functions of, for example, generating an RGB image from the sensor signal, enlarging and reducing an image, and encoding an image. It is assumed that a RAM required to perform the processing operations described above is incorporated in the first ISP 102, but the first ISP 102 may be connected to an external RAM.

A position/orientation estimation unit 103 estimates the position and orientation of the MR apparatus 100 by using the image obtained by the first ISP 102. The position/orientation estimation unit 103 can estimate the position and orientation of, for example, a second sensor 104 incorporated in the MR apparatus 100. In the present embodiment, the position/orientation estimation unit 103 is a CPU incorporating therein a ROM (read-only memory) and a RAM (random-access memory). The CPU performs position/orientation estimation processing by performing operations in accordance with a position/orientation estimation program stored in the ROM by using the RAM as a work area. As the position/orientation estimation program, it is possible to use a program according to the method disclosed in Non-Patent Document 1. The position/orientation estimation unit 103 may be dedicated HW (hardware). Also, the position/orientation estimation processing is not limited to the method disclosed in Non-Patent Document 1, and it is also possible to use, for example, a visual SLAM method as disclosed in Non-Patent Document 2.

The second sensor 104 captures a second image. In the present embodiment, the second sensor 104 is a rolling shutter sensor capable of capturing images, each of which is 1920 pixels high and 1080 pixels wide, at a speed of 60 fps. In the present embodiment, the sensor is connected to a lens unit, and thus is capable of capturing a video composed of sequential images to obtain a sensor signal. Note that the resolution and the frame rate are not limited to the above values.

A second ISP 105 converts the sensor signal obtained by the second sensor 104 into an image. The second ISP 105 may have the same function as the first ISP 102.

A CG rendering unit 106 generates a synthesized image by using an image output from the second ISP 105. In the present embodiment, the CG rendering unit 106 generates a synthesized image through rendering by overlaying a virtual CG object on the image while retaining three-dimensional (computer graphics) object information. For example, the CG rendering unit 106 can render a virtual CG object in accordance with the CG object information and superimpose the obtained virtual CG object on the image. At this time, the virtual CG object to be superimposed and the position at which the virtual CG object is superimposed are controlled according to the position and orientation of the MR apparatus 100 estimated by the position/orientation estimation unit 103. For example, the CG rendering unit 106 can generate a synthesized image by rendering a virtual CG object by providing viewpoints at the positions according to the estimated position and orientation of the MR apparatus 100, and then superimposing the obtained virtual image on the image output from the second ISP 105.

A display unit 107 displays the synthesized image generated by the CG rendering unit 106. A user of the MR apparatus 100 can view an image through the display unit 107.

In the present embodiment, the sensors 101 and 102 are fixedly disposed at positions close enough to capture images of the same field of view. Also, a half-mirror may be provided in the optical path such that the sensors 101 and 102 can capture images of the same field of view. Note that the same field of view is not a requirement. In the case where the sensors 101 and 102 have different fields of view, for example, the position/orientation estimation unit 103 may correct the difference in the field of view. Alternatively, the ISP 102 and the ISP 105 may perform geometric correction processing such that the images output by the sensors have the same field of view, and then output the images.

Hereinafter, overall operations of the MR apparatus 100 will be described. In FIG. 1, the arrows indicate the flow of main data. A control signal and the like can be bidirectionally transferred between the constituent units, but a description of the control signal and the like are omitted here.

The signal of the sensor 101 is output to the ISP 102. The ISP 102 generates an RGB image and outputs the RGB image to the position/orientation estimation unit 103 in the form of a signal. In this specification, a pair of a sensor and an ISP will be referred to as "imaging system". Also, an imaging system including the sensor 101 and the ISP 102 will be referred to as "analysis image imaging system". Furthermore, an image generated by the analysis image imaging system will be referred to as "analysis image".

The position/orientation estimation unit 103 analyzes the analysis image so as to generate position and orientation information. In the present embodiment, the position/orientation estimation unit 103 generates position and orientation information indicating the position and orientation of the MR apparatus 100 in a three-dimensional space, generates an environmental map based on the position and orientation information, and outputs the position and orientation information and the environmental map to the CG rendering unit 106.

The signal of the sensor 104 is output to the ISP 105. The ISP 105 generates an RGB image, and outputs the RGB image to the CG rendering unit 106 in the form of a signal. In this specification, an imaging system including the sensor 104 and the ISP 105 will be referred to as "view image imaging system". Also, an image generated by the view image imaging system will be referred to as "view image".

The CG rendering unit 106 renders a three-dimensional computer graphics object, which is virtually present, on the view image as an image projected onto the screen of the view image, based on the position and orientation information. In the present embodiment, the CG rendering unit 106 renders the virtual CG object on the view image, and outputs a generated synthesized image to the display unit 107 in the form of a signal. At this time, the CG rendering unit 106 acquires the position and orientation information and the environmental map information from the position/orientation estimation unit 103, and renders the virtual CG object on the view image as if the CG object was in its place in a virtual three-dimensional space. The display unit 107 displays the image obtained from the CG rendering unit 106. These operations are performed while images are sequentially captured and processed.

In the present embodiment, the MR apparatus 100 includes the analysis image imaging system (including 101 and 102), the view image imaging system (including 104 and 105), and the display unit 107. However, the MR apparatus 100 may include another set of these processing units. The MR apparatus 100 having this configuration can be used as a head mounted display (HMD) that captures and displays an image for the left eye and an image for the right eye. Also, in FIG. 1, the processing units are illustrated as directly connected to each other, but the configuration is not limited thereto. The processing units may be connected via a bus. In this case, the processing units can transmit and receive signals via the bus.

A conventional MR apparatus includes only one imaging system, and is configured to estimate the position and orientation of the MR apparatus based on an image obtained by the imaging system and render a virtual CG object on an image obtained by the same imaging system. For this reason, in the case where a rolling shutter is used in a sensor of the imaging system, a rolling shutter distortion occurs, and it is therefore difficult to estimate the position and orientation of the MR apparatus. On the other hand, in the case where a global shutter sensor such as a CCD is used, power consumption increases significantly when the resolution and the frame rate are increased.

The MR apparatus 100 according to the present embodiment includes two imaging systems, namely, an analysis image imaging system and a view image imaging system. The analysis image imaging system including the sensor 101 has a relatively low image deterioration tendency for a moving object, and the view image imaging system including the sensor 104 has a relatively high image deterioration tendency for a moving object. That is, the image deterioration when a moving object is captured is smaller in the analysis image imaging system than in the view image imaging system. On the other hand, according to one present embodiment, the view image imaging system has better image quality than the analysis image imaging system. For example, the view image imaging system may have a higher resolution than the analysis image imaging system. For example, a global shutter sensor having a low resolution can be used in the analysis image imaging system, and a rolling shutter sensor having a high resolution can be used in the view image imaging system. With this configuration, it is possible to achieve both good position/orientation estimation performance and good view image quality.

As the sensor 101 of the analysis image imaging system, a rolling shutter sensor that can be driven at a high speed may be used instead of a global shutter sensor. For example, when a frame image is acquired by using a sensor that can be driven at a vertical scanning time of 4 ms (corresponding to 240 fps), the amount of rolling shutter distortion is reduced to one fourths of the amount of rolling shutter distortion when a sensor that can be driven at a vertical scanning time of 16 ms (corresponding to 60 fps) is used. As described above, it is possible to obtain the analysis image with a smaller amount of rolling shutter distortion than that when a rolling shutter sensor that is driven at a low speed is used. Accordingly, the position/orientation estimation performance can be improved. It is sufficient that the sensor 101 has a less number of pixels than that of the sensor 104, and it is therefore easy to use a sensor that can be driven at a high speed.

Also, both the sensor 101 and the sensor 104 may be global shutter sensors. Generally, sharp images with a small amount of motion blur (blur caused by motion) can be obtained when captured at a high shutter speed. The motion blur is a factor that makes it difficult to perform image analysis, and thus an image with a small amount of motion blur is suitable for use in position/orientation estimation. However, a discontinuity in motion called "jerkiness" occurs in a video captured at a high shutter speed, which causes the viewer to feel a sense of discomfort when viewing the video. To address this, the sensor 101 can be driven at a high shutter speed (for example, an aperture time of 4 ms), and the sensor 104 can be driven at a low shutter speed (for example, an aperture time of 16 ms). Even with this configuration, it is possible to achieve both good position/orientation estimation performance and good view image quality. The sensor 101 may have a less number of pixels than that of the sensor 104, and it is therefore easy to drive the sensor 101 at a high shutter speed.

The analysis image and the view image may have different frame rates. According to one embodiment, in order to enhance the position/orientation estimation performance, a shutter that can be driven at a high speed and perform capturing at a high speed is used as the sensor 101. In this case, the analysis image has a higher frame rate than that of the view image.

Embodiment 2

Figure 2:
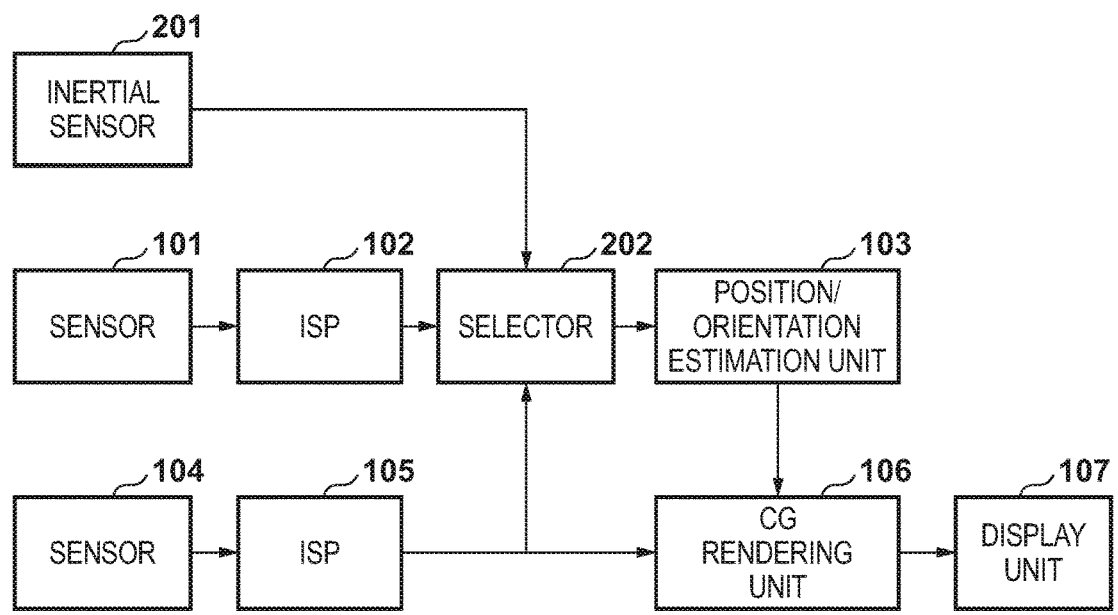
FIG. 2 is a diagram illustrating a MR apparatus configurations in Embodiment 2.

An MR apparatus 200, which is an image processing apparatus according to Embodiment 2 of the present invention, will be described with reference to FIG. 2. The MR apparatus 200 is different from the MR apparatus 100 in that an inertial sensor 201 and a selector 202 are added. Unless otherwise stated, the operations of the MR apparatus 200 are the same as those of the MR apparatus (for example, a head mounted display) 100 according to Embodiment 1.

The inertial sensor 201 outputs speed information of the MR apparatus 200. As the inertial sensor 201, a gyroscopic sensor, an accelerometer sensor and the like can be used. These are sensors that detect an acceleration, and the speed can be obtained through calculation from the acceleration. In the present embodiment, the inertial sensor 201 includes a gyroscopic sensor, an accelerometer sensor and a calculation processing unit, and is capable of outputting the speed information of the MR apparatus 200. In the present embodiment, the inertial sensor 201 outputs the speeds in the horizontal and vertical directions relative to the sensor plane of the apparatus, as well as an angular speed. As the method for calculating the speed information from acceleration information, any method can be used. Accordingly, a detailed description of the method is omitted in this specification. The processing for calculating the speed information does not need to be performed in the inertial sensor 201, and may be performed by a computation unit provided outside.

The selector 202 has a function of outputting one of two inputs. The selector 202 includes, for example, a programmable computation unit, and is capable of selecting and outputting one input according to the result of computation. The operations of the selector 202 will be described later.

The operations of the MR apparatus 200 according to Embodiment 2 will be described. In the present embodiment, the ISP 102 outputs an RGB image generated within the ISP 102 after vertically and horizontally enlarging the RGB image by a factor of two. The inertial sensor 201 is fixed to the MR apparatus 200, detects the speed information of the MR apparatus 200, and outputs the speed information to the selector 202. The selector 202 calculates the amount of motion of the MR apparatus 200 from the speed information. If it is determined that the amount of motion is greater than or equal to a threshold, an image signal from the ISP 102 is output to the position/orientation estimation unit 103. If, on the other hand, it is determined that the amount of motion is less than the threshold, the selector 202 outputs an image signal from the ISP 105 to the position/orientation estimation unit 103.

The threshold can be configured such that the image signal from the ISP 102 is output to the position/orientation estimation unit 103 when the amount of motion of MR apparatus is too large that it is difficult to estimate the position and orientation of the MR apparatus 200 from the view image, and otherwise the image signal from the ISP 105 is output to the position/orientation estimation unit 103. The amount of motion varies depending on the sensor size, the resolution, the lens focal length, the distance to an object, or the like. In the present embodiment, the amount of motion of the MR apparatus 200 is expressed by a motion in one frame (for example, 16 ms) of an object at a center portion of the image, the object being located at a position 30 cm away from the camera. Accordingly, the amount of motion can be expressed in pixels. If the amount of motion is, for example, 4 pixels or more, the image input from the ISP 102 is used. Note that the value is not limited to 4 pixels. These operations are performed while images are sequentially captured and processed, and thus switching performed by the selector 202 is also performed per frame image.

In the present embodiment, the addition of the inertial sensor 201 and the selector 202 enables, when the MR apparatus 200 is stationary or is slightly moving, more highly accurate position/orientation estimation to be performed by using the view image having a higher resolution. Also, as described in Embodiment 1, when the MR apparatus 200 is moving, highly accurate position/orientation estimation can be performed by using the analysis image with a small amount of rolling shutter distortion. According to one embodiment, the output destination to which a frame image is output can be switched according to the amount of motion of the MR apparatus 200 obtained at the time of capturing the frame image. However, the output destination to which a frame image is output may be switched according to the amount of motion of the MR apparatus 200 obtained before or after the time of capturing the frame image. In this case as well, the above-described effects can be obtained.

Embodiment 3

Figure 3:
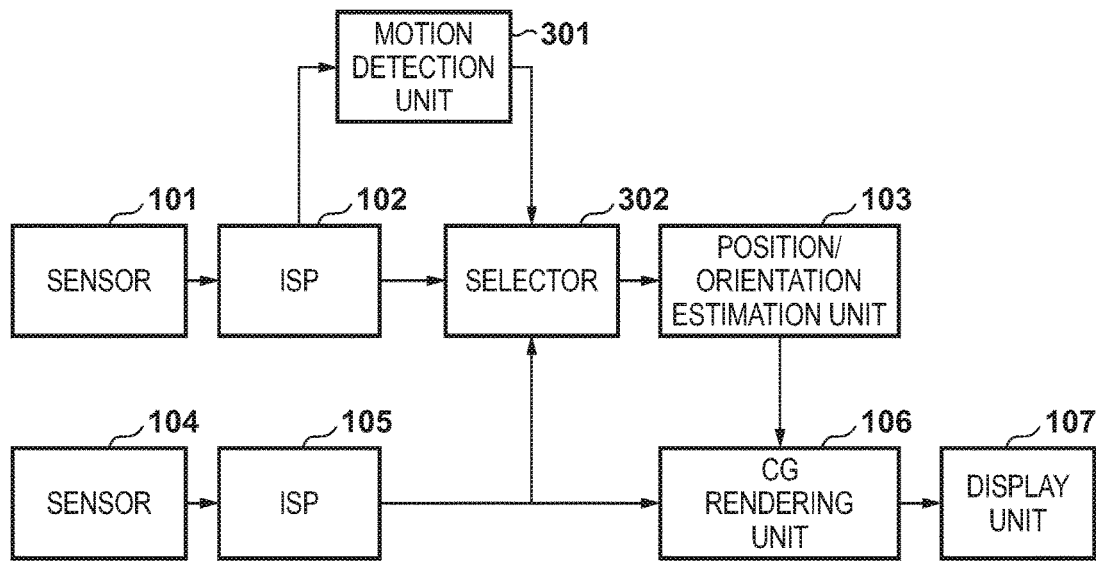
FIG. 3 is a diagram illustrating a MR apparatus configurations in Embodiment 3.

An MR apparatus 300, which is an image processing apparatus according to Embodiment 3 of the present invention, will be described with reference to FIGS. 3 to 6. FIG. 3 is a diagram illustrating a configuration of the MR apparatus 300 according to Embodiment 3. The MR apparatus 300 is different from the MR apparatus 100 in that a motion detection unit 301 and a selector 302 are added. Unless otherwise stated, the operations of the MR apparatus 300 are the same as those of the MR apparatus 100 according to Embodiment 1.

The motion detection unit 301 detects a motion between images captured by the sensor 101, and outputs the detected motion to the selector 302. In the present embodiment, the motion detection unit 301 includes a ROM, a RAM and a CPU. The CPU executes a program stored in the ROM to perform operations described below by using the RAM as a work area. The motion detection unit 301 does not need to include a CPU, and it is also possible to use a dedicated HW having the same function as the motion detection unit 301.

The selector 302 has the same function as that of the selector 202 according to Embodiment 2. The operations of the selector 302 will be described later.

Hereinafter, overall operations of the MR apparatus (for example, a head mounted display) 300 will be described. The motion detection unit 301 acquires images from the ISP 102, detects the amount of motion between images, and outputs the detected amount of motion to the selector 302. The method for calculating the amount of motion will be described later. If it is determined that the amount of motion is greater than or equal to a threshold, the selector 302 outputs an image signal from the ISP 102 to the position/orientation estimation unit 103. If, on the other hand, it is determined that the amount of motion is smaller than the threshold, the selector 302 outputs an image signal input from the ISP 105 to the position/orientation estimation unit 103. The threshold can be configured in the same manner as in Embodiment 2. Here, the threshold is configured such that if the amount of motion is 4 pixels or more, an image input from the ISP 102 is used.

Hereinafter, the method for detecting the amount of motion between frames performed by the motion detection unit 301 will be described with reference to FIG. 4. In step S4010, the motion detection unit 301 detects a motion vector of an object between a plurality of frame images. For example, a plurality of motion vectors of a plurality of objects can be detected by using two sequential frame images output from the ISP 102. In step S4020, the motion detection unit 301 calculates the length of each of the plurality of detected motion vectors. In step S4030, the motion detection unit 301 calculates the average of the lengths of the plurality of detected motion vectors. The average value thus obtained is used as the amount of motion.

Figure 4:
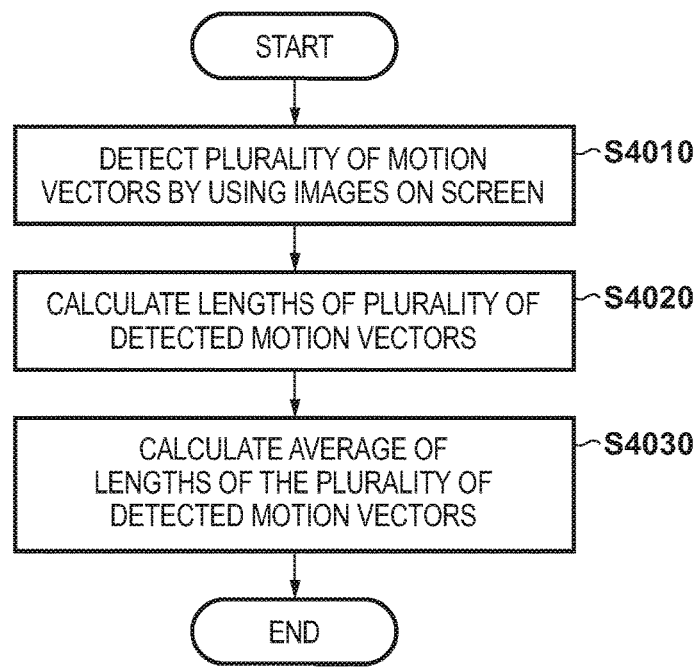
FIG. 4 is a flowchart illustrating a method of detecting an amount of motion in Embodiment 3.
Figure 5:
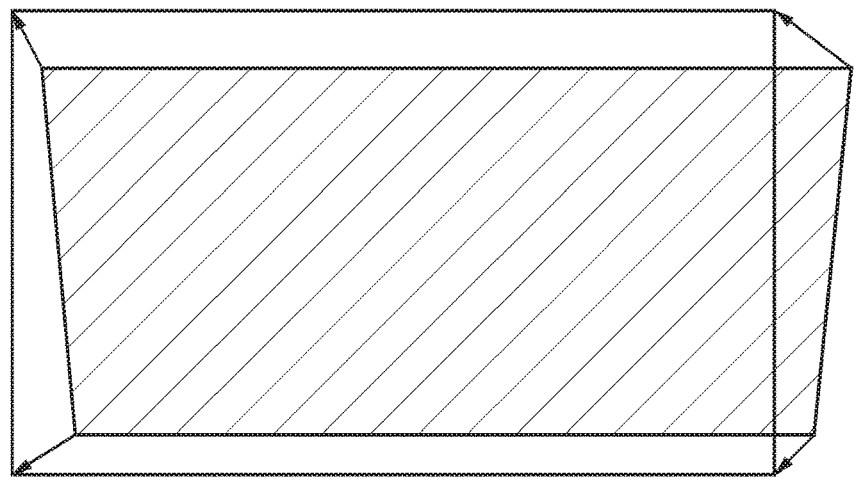
FIG. 5 is a diagram illustrating geometric conversion of frame images.
Figure 6:
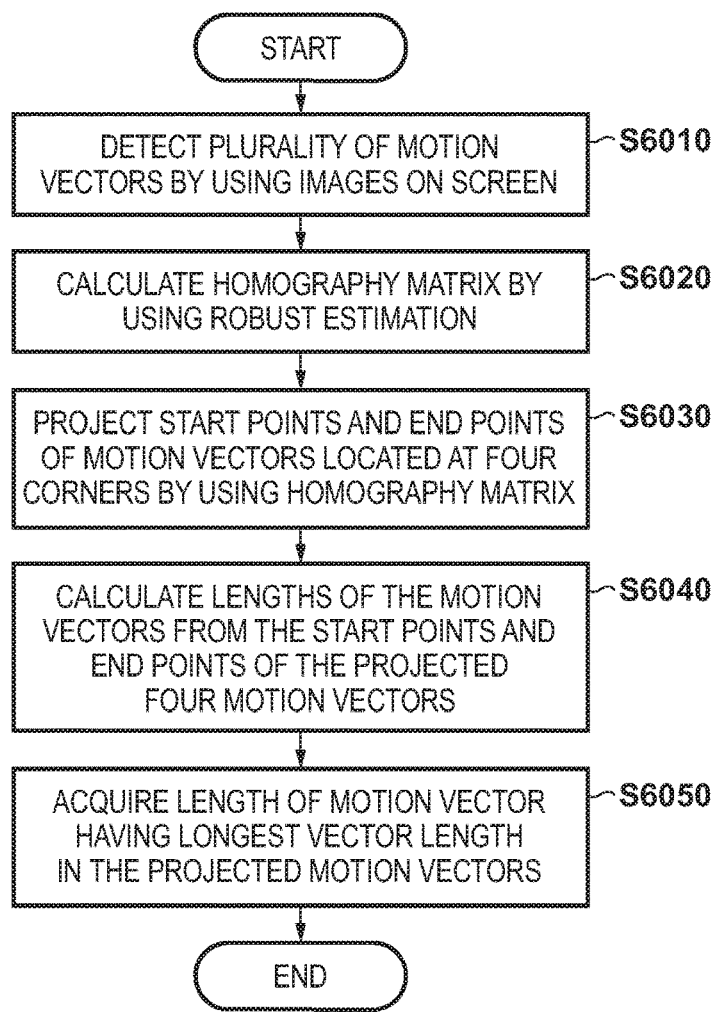
FIG. 6 is a flowchart illustrating a modified example of a method of detecting an amount of motion in Embodiment 3.

The method for detecting the amount of motion is not limited to the method shown in FIG. 4. The amount of motion can also be detected by using, for example, a method shown in FIGS. 5 and 6. The following method may be used. FIG. 5 is a diagram illustrating geometric conversion of frame images. The rectangle without shading indicates the current frame, and the shaded region indicates the previous frame that is immediately prior in time. It can be seen from FIG. 5 that in addition to horizontal and vertical translations, tilt and shift motions of the MR apparatus 300 have occurred between the previous frame and the current frame. Such a planar motion in a three-dimensional space can be expressed by a homography matrix. Hereinafter, the method for calculating the amount of motion after calculating a homography matrix will be described with reference to FIG. 6.

In step S6010, the motion detection unit 301 detects a plurality of motion vectors in the same manner as in step S4010. In step S6020, the motion detection unit 301 calculates a homography matrix based on the detected motion vectors. As the method for calculating a homography matrix, it is possible to use robust estimation such as RANSAC or M-estimation, but there is no limitation on the calculation method. In step S6030, the motion detection unit 301 projects the start points and the end points of the motion vectors located at four corners of the screen by using the homography matrix. In step S6040, the motion detection unit 301 calculates the length of each motion vector obtained by the projection based on the start points and the end points of the four motion vectors obtained by the projection. In step S6050, the motion detection unit 301 selects the motion vector having the longest length in the motion vectors obtained by the projection. In the present embodiment, the length of the motion vector selected in the manner described above is used as the amount of motion. In the description of this example, the motion vectors located at four corners of the screen are projected, but the motion vectors located at different points may be projected. Also, the number of points at which there are motion vectors to be projected may be greater or less than shown above.

In the present embodiment, the motion detection unit 301 that electronically detects motion is used instead of the inertial sensor 201 used in Embodiment 2, and thus the inertial sensor 201 can be omitted. In the present embodiment, the motion detection unit 301 includes the dedicated CPU, but the processing operations of a plurality units such as the motion detection unit 301 and the selector 302 can be implemented by using one CPU through, for example, time-division processing or the like. In this case, a CPU having a computation ability sufficient to implement the processing operations of the plurality of units is used.

Embodiment 4

Figure 7:
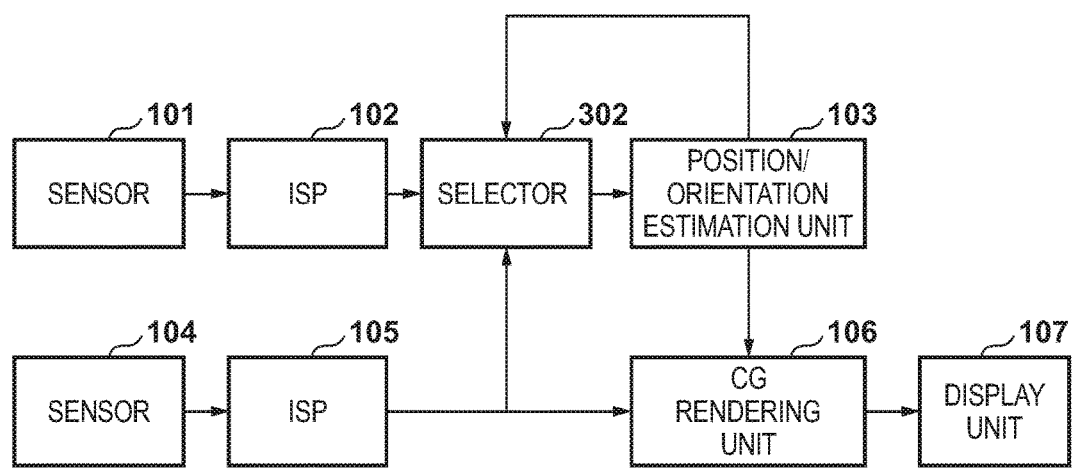
FIG. 7 is a diagram illustrating a MR apparatus configurations in Embodiment 4.

An MR apparatus (for example, a head mounted display) 700, which is an image processing apparatus according to Embodiment 4 of the present invention, will be described with reference to FIG. 7. In the present embodiment, the position/orientation estimation unit 103 has a function of calculating motion information. Unless otherwise stated, the operations of the MR apparatus 700 are the same as those of the MR apparatus 200 according to Embodiment 2.

Hereinafter, overall operations of the MR apparatus 700 will be described. By using the position and orientation information calculated by the position/orientation estimation unit 103, a relative position of the MR apparatus 700 in a three-dimensional space can be calculated. In the present embodiment, the position/orientation estimation unit 103 calculates the amount of change of the relative position between frames, or in other words, the amount of motion of the MR apparatus 700. The amount of motion can be expressed in the same manner as in Embodiment 2.

The position/orientation estimation unit 103 feeds back the amount of motion to the selector 302. If it is determined that the amount of motion is too large that it is difficult to perform image analysis from the view image, the selector 302 outputs an image signal input from the ISP 102 to the position/orientation estimation unit 103. If it is determined that the amount of motion is small, the selector 302 outputs an image signal from the ISP 105 to the position/orientation estimation unit 103. This operation is the same as that of the selector 302 according to Embodiment 3.

These operations are performed while images are sequentially captured and processed, and thus switching performed by the selector is also performed per frame image. Note that switching performed by the selector is performed from a next frame of the frame in which the motion occurred. The same effects as those of Embodiment 2 can be obtained without the need to provide an additional module such as an inertial sensor.

Embodiment 5

A fifth embodiment directed to an MR system will be described with reference to FIG. 8. The present embodiment will be described based on the assumption that the MR system includes a HMD and a host computer, and the HMD and the host computer are connected via a network. Unless otherwise stated, the operations are the same as those described in Embodiment 2 with reference to FIG. 2.

Figure 8:
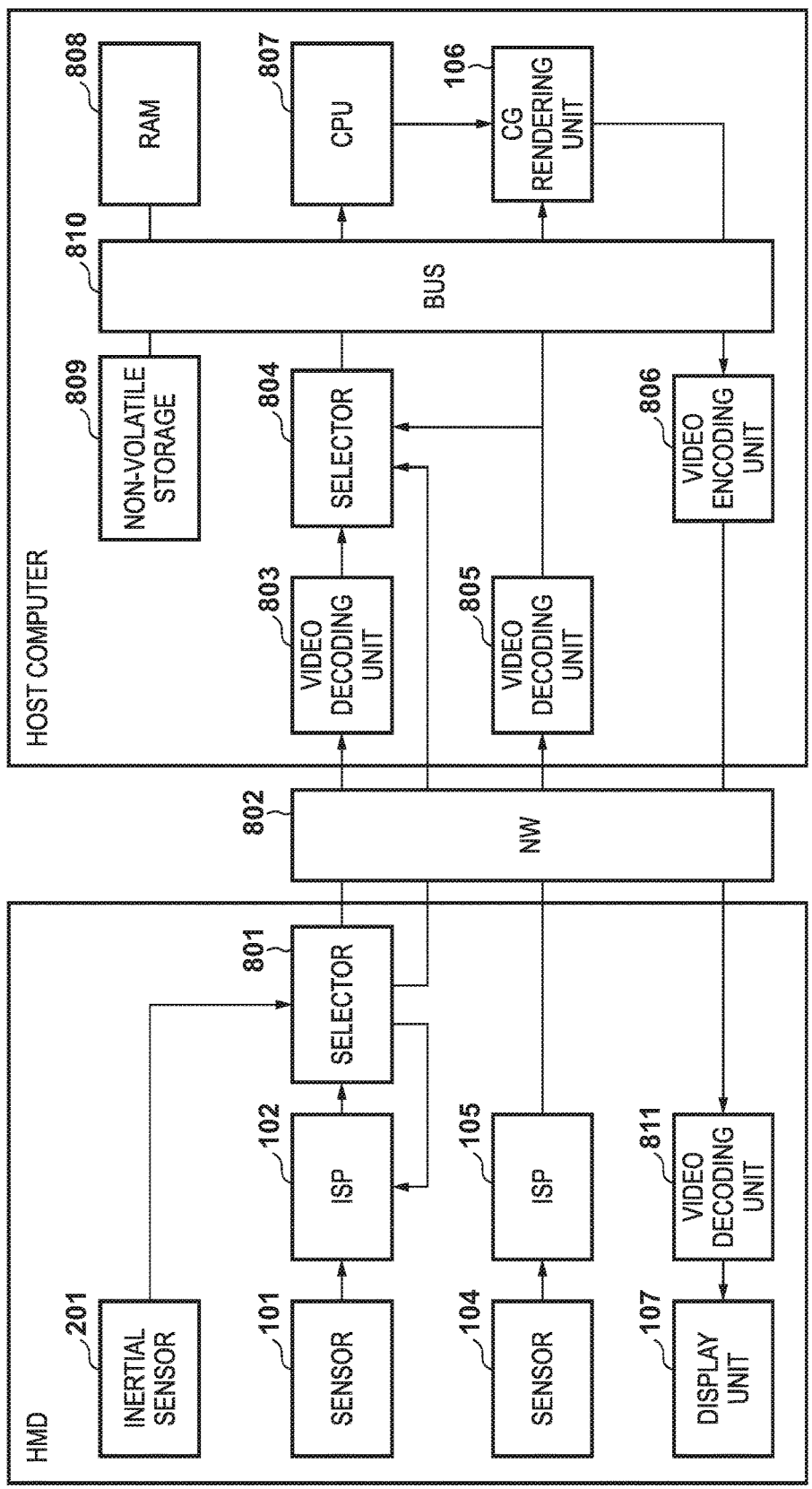
FIG. 8 is a diagram illustrating a MR system configurations in Embodiment 5.

FIG. 8 is a diagram illustrating a configuration of the MR system according to Embodiment 5. Reference numeral 801 indicates a selector that controls the presence or absence of output of a signal. Reference numeral 802 indicates a NW (network system). The HMD and the host computer each include a packetizer circuit, a base band engine, an RF unit and an antenna, and the HMD and the host computer are configured so as to be capable of freely transmitting main data therebetween. Reference numerals 803, 805 and 811 indicate video decoding units. Reference numeral 804 indicates a selector that selects a signal. Reference numeral 807 indicates a CPU. Reference numeral 808 indicates a RAM. Reference numeral 809 indicates a non-volatile storage. The CPU 807 reads a program stored in the non-volatile storage 809 into the RAM 808 so as to execute the program. Reference numeral 810 indicates a bus. The modules are connected by the bus, and the modules connected by the bus are configured to, unless otherwise stated, exchange data.

In the present embodiment, unlike Embodiment 1, the ISP 102 and the ISP 105 are configured to encode and output a video. The present embodiment will be described based on the assumption that the encoding scheme handled by ISP 102, the ISP 105, the video decoding unit 803, the video decoding unit 805, the video decoding unit 806 and the video decoding unit 811 is H.264, but the encoding scheme is not limited thereto. The ISP 102 outputs an encoded stream to the selector 801. If it is determined that the amount of motion that has been input is too large that it is difficult to perform image analysis from the view image, the selector 801 outputs an input image signal to the video decoding unit 803 via the NW 802. If it is determined that the amount of motion is small, the selector 801 stops the output. The selector 801 continues to output a stop signal to the ISP 102 while stopping the output of the image signal. With the inter-frame encoding scheme such as H.264, subsequent inter-frames can be encoded after intra-frames have been decoded. Accordingly, the ISP 102 encodes the video by using only the intra-frames while receiving the stop signal, and starts inter-frame encoding after completion of the reception of the stop signal. With this configuration, highly compressive inter-frame encoding is implemented, and at the same time, intra-frames are transmitted when the transmission of an encoded stream is resumed, and thus decoding can be immediately resumed.

The video decoding unit 803 decodes the encoded stream so as to generate a image signal, and outputs a generated image signal to the selector 804. The ISP 105 outputs an encoded stream to the video decoder 805 via the NW 802. The video decoder 805 decodes the encoded stream so as to generate an image signal. When the selector 801 transmits data, the selector 804 outputs the image signal input from the video decoding unit 803 to the CPU 807. When the selector 801 does not transmit data, the selector 804 outputs the image signal input from the video decoder 805 to the CPU 807. The output may be performed via the RAM. The CPU 807 performs position/orientation estimation, and outputs position and orientation information and an environmental map to the CG rendering unit 106. The CG rendering unit 106 performs the operations described in Embodiment 1, and outputs a generated image to the video encoding unit 806. The video encoding unit 806 outputs an encoded stream obtained by encoding the image to the video decoding unit 811 via the NW 802. The video decoding unit 811 decodes the encoded stream, and outputs a generated image signal to the display unit 107. These operations are performed while images are sequentially captured and processed, and thus the selector performs switching per each frame image.

As described above, according to the present embodiment, both the analysis image and the view image are transmitted from the HMD to the host computer, and the host computer generates a synthesized image by using both the analysis image and the view image. Accordingly, the same effects as those of Embodiment 1 can be obtained. Also, in the present embodiment, transmission of the analysis image is controlled according to the amount of motion. That is, according to the present embodiment, in addition to the effects described in Embodiment 2, when the amount of motion is small in the image, the transmission of the analysis image via the NW is suppressed, and thus the NW bandwidth can be reduced. It is also possible to perform an operation of generating a view image of an even higher definition image by assigning the amount of encoding corresponding to the amount of reduction to the amount of encoding used to encode the view image. Note that, however, it is not necessary to control transmission of the analysis image according to the amount of motion in order to obtain the same effects as those of Embodiment 1.

Embodiment 6

Figure 9:
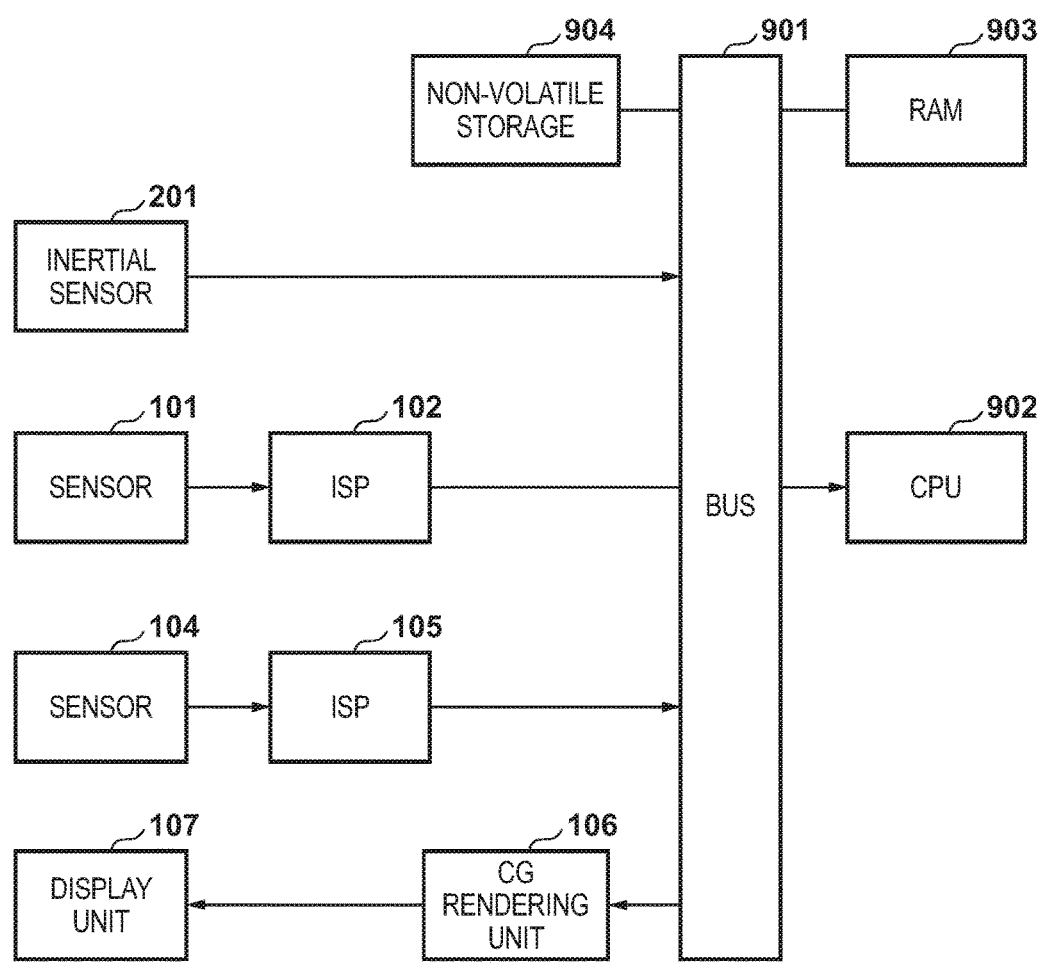
FIG. 9 is a diagram illustrating a MR apparatus configurations in Embodiment 6.
Figure 10:
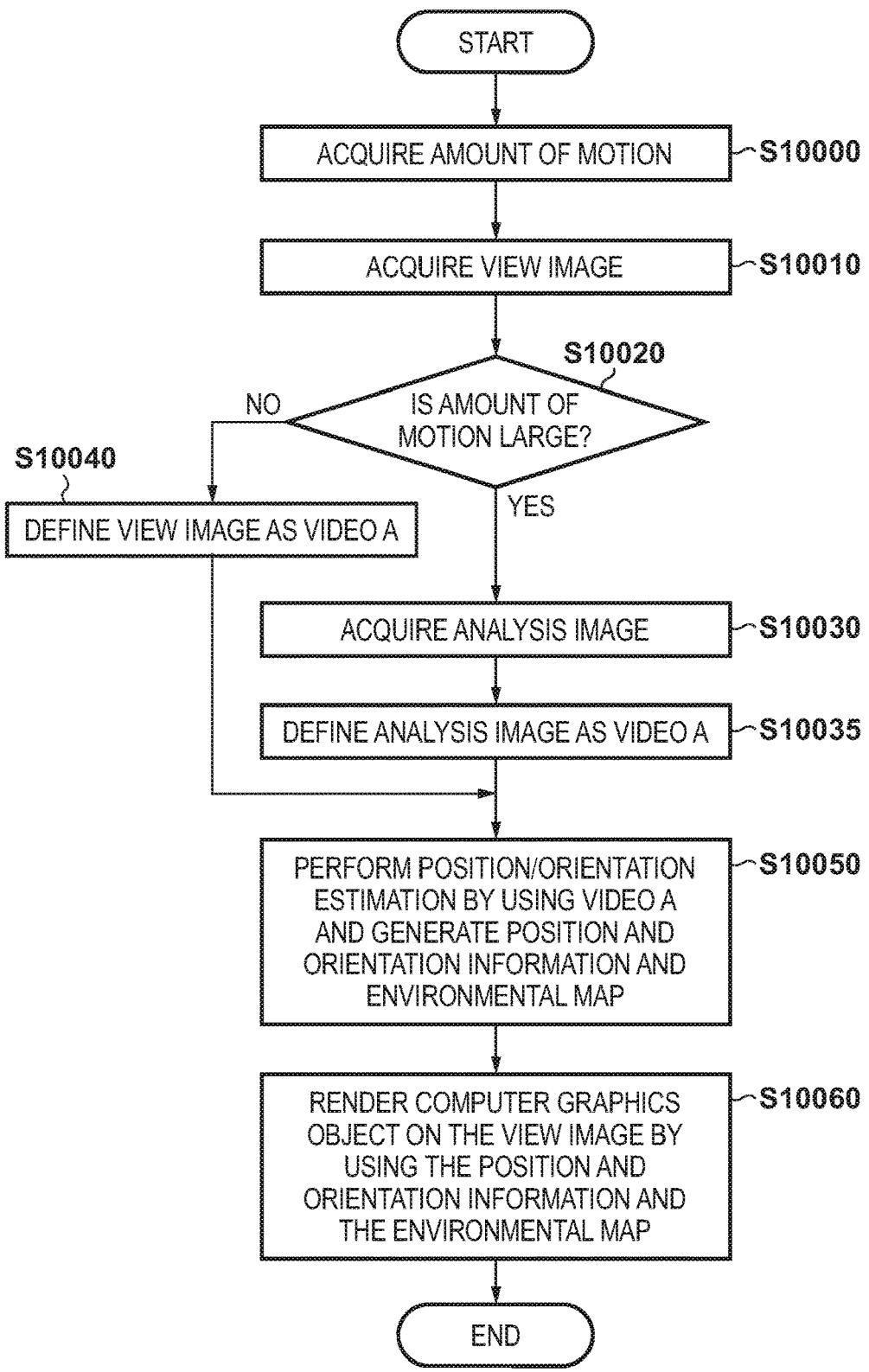
FIG. 10 is a flowchart illustrating a processing method of a MR apparatus in Embodiment 6.

A sixth embodiment directed to an MR system will be described with reference to FIGS. 9 and 10. FIG. 9 is a diagram illustrating a configuration of the MR system according to Embodiment 6. FIG. 9 is different from FIG. 2 in that processing units 901 to 904 are added. Unless otherwise stated, the operations are the same as those described in Embodiment 2 with reference to FIG. 2.

Reference numeral 901 indicates a bus. Reference numeral 902 indicates a CPU. Reference numeral 903 indicates a RAM. Reference numeral 904 indicates a non-volatile storage. A configuration is used in which a program stored in the non-volatile storage is read into the RAM via the bus and executed by the CPU. In the present embodiment, a position/orientation estimation program is executed so as to generate position and orientation information and environmental map information. Also, the amount of motion output by the inertial sensor 201 and the video data output by the ISP 102 and the ISP 105 are stored in the RAM 903 via the bus and used as input data of the program. The CG rendering unit 106 acquires the image data stored in the RAM 903 via the bus, renders a computer graphics object, and outputs the rendered computer graphics object to the display unit 107. Also, the CPU 902 controls the modules. Unless otherwise stated, the modules connected by the bus are configured to input and output data via the bus.

Hereinafter, the operations of the position/orientation estimation program executed by the CPU 902 will be described with reference to FIG. 10. FIG. 10 is a flowchart illustrating a position/orientation estimation method according to Embodiment 6. In S10000, the amount of motion is acquired. In the present embodiment, the amount of motion output from the inertial sensor 201 is acquired. In S10010, a view image is acquired. In S10020, the magnitude of the amount of motion is determined. If it is determined that the amount of motion is too large that it is difficult to perform image analysis from the view image, S10030 is performed. If it is determined that the amount of motion is small, S10040 is performed. In S10030, an analysis image is acquired. As described above, the analysis image has a small amount of image deterioration caused by motion than the view image. In S10035, the analysis image is defined as video A. In S10040, the view image is defined as video A. In S10050, the video A is used to generate position and orientation information and an environmental map.

In S10060, the position and orientation information and the environmental map are used to render a computer graphics object on the view image. Through the above steps, an image is generated in which the computer graphics object is shown as if it was in its place in a virtual three-dimensional space. In the present embodiment, a configuration is used in which the operations are executed by the CPU 902 providing instructions to the CG rendering unit 106, but the configuration is not limited thereto, and the superimposing processing may be performed by the CPU 902. These operations are performed while images are sequentially captured and processed, and thus making a determination based on the conditions is also performed per frame image.

Even with the configuration of the present embodiment, the same effects as those of Embodiment 2 can be obtained. In the present embodiment, the output from the inertial sensor is used as the amount of motion, but as shown in Embodiments 3 and 4, it is possible to use a configuration in which a value calculated through software processing is acquired. The present embodiment shows an example in which the amount of motion is acquired, but it is also possible to use a configuration in which the amount of motion is not used. Hereinafter, this will be described as a variation with reference to FIG. 11.

Figure 11:
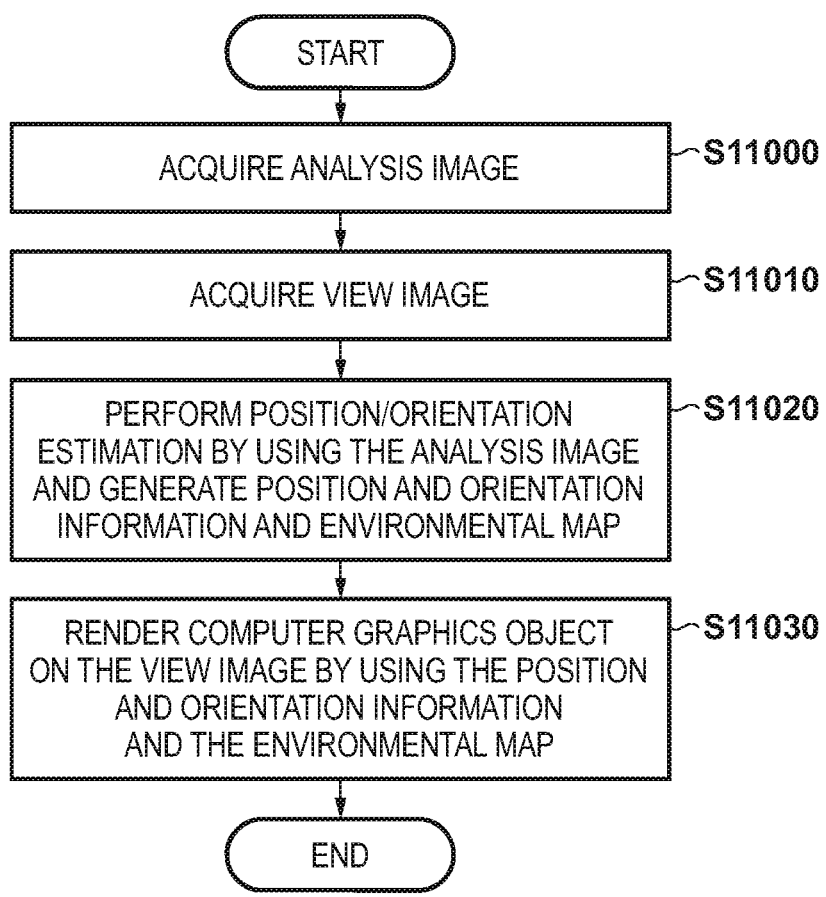
FIG. 11 is a flowchart illustrating a modified example of a processing method of a MR apparatus in Embodiment 6.

FIG. 11 is a flowchart illustrating a variation of Embodiment 6. In S11000, an analysis image is acquired. In S11010, a view image is acquired. In S11020, position and orientation information and an environmental map are generated by using the analysis image. In S11030, a computer graphics object is rendered on the view image by using the position and orientation information and the environmental map.

Through the above steps, an image is generated in which the computer graphics object is shown as if it was in its place in a virtual three-dimensional space. Even with this configuration, it is possible to obtain the same effects as those of Embodiment 1.

Embodiment 7

Figure 12:
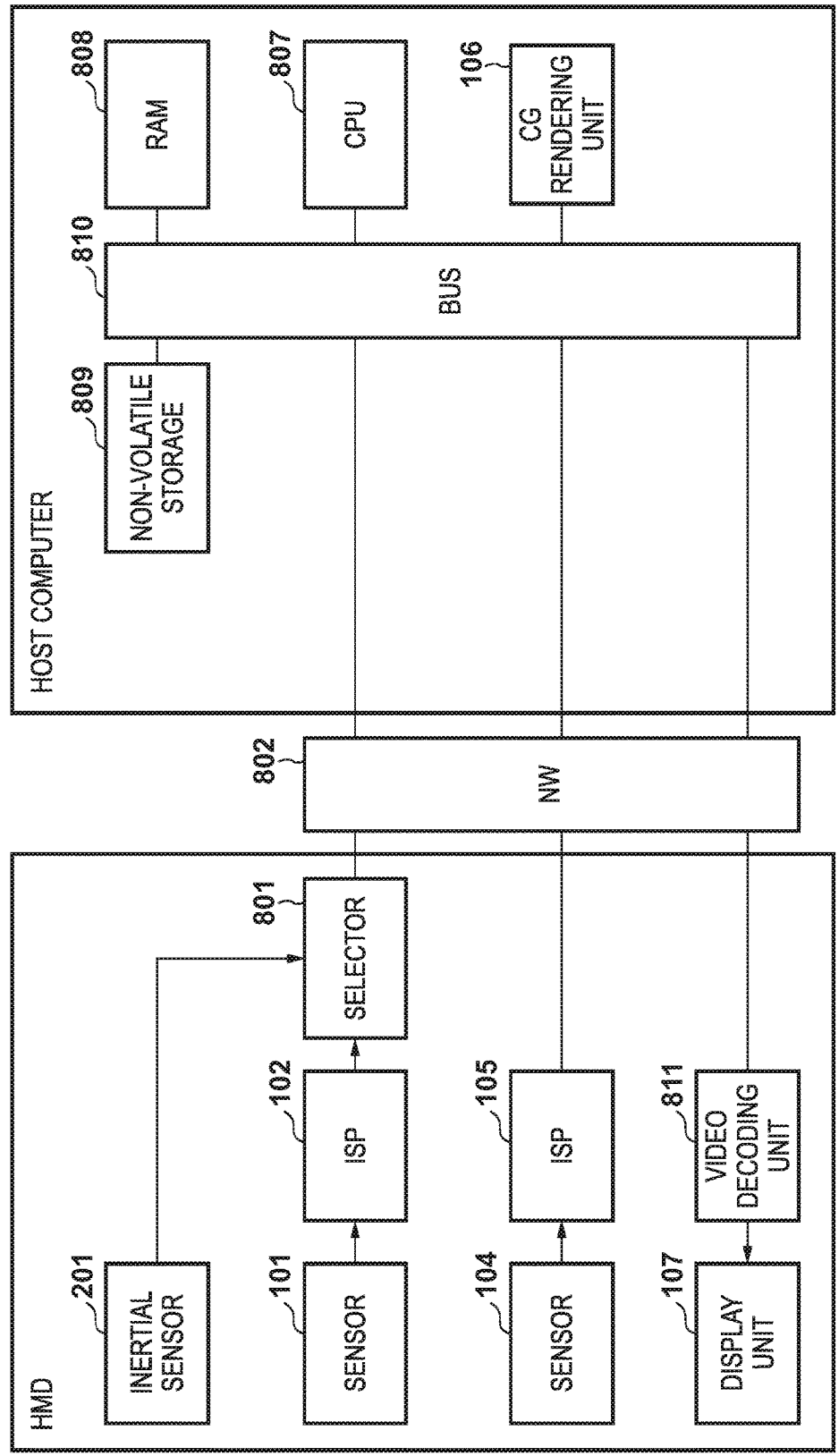
FIG. 12 is a diagram illustrating a MR system configurations in Embodiment 7.
Figure 13:
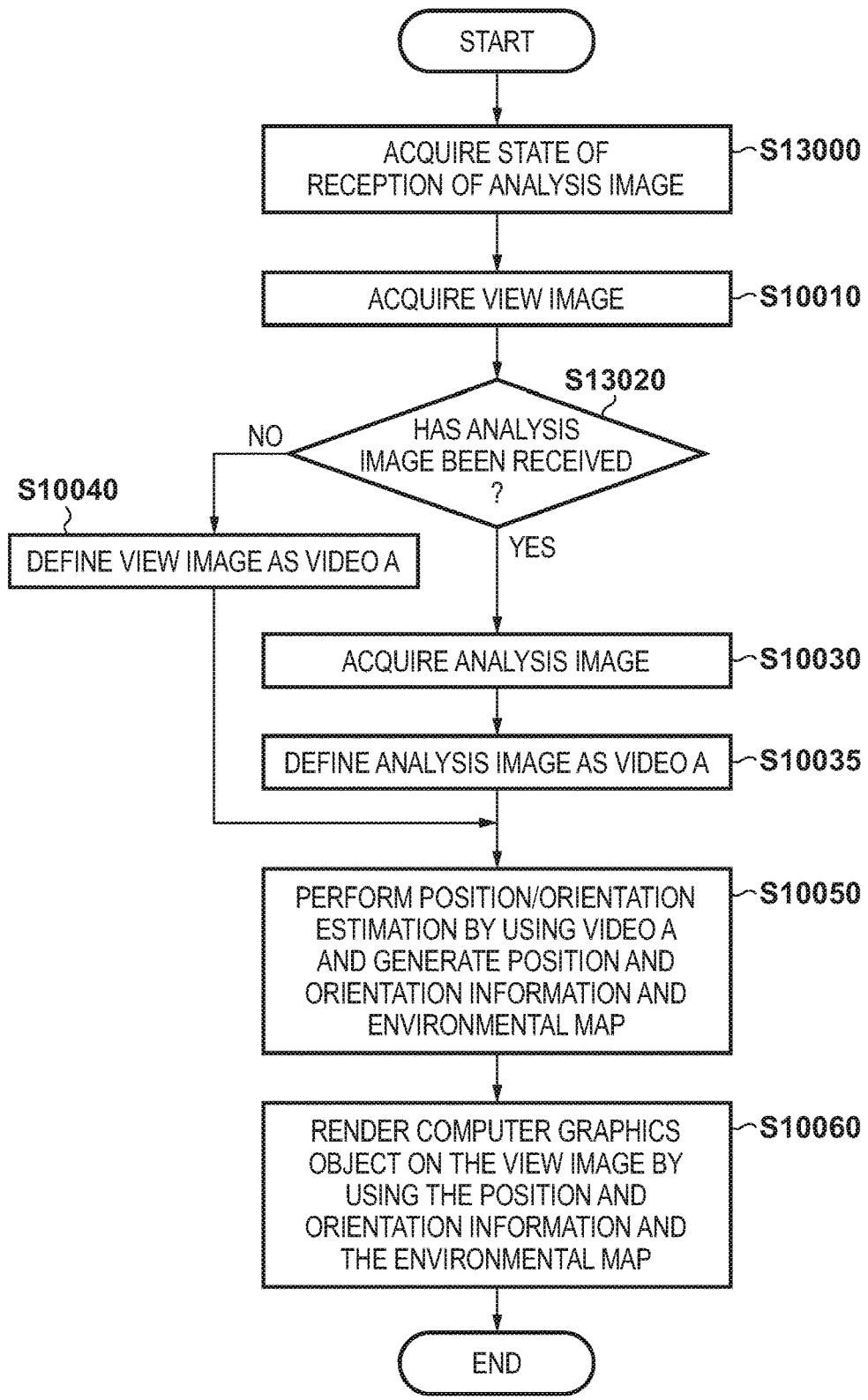
FIG. 13 is a flowchart illustrating a processing method of a MR apparatus in Embodiment 7.

A seventh embodiment directed to an MR system will be described with reference to FIGS. 12 and 13. FIG. 12 is a diagram illustrating a configuration of the MR system according to Embodiment 7. Unless otherwise stated, the operations are the same as those described in Embodiment 5 with reference to FIG. 8.

FIG. 12 is a diagram illustrating a configuration of the MR system according to Embodiment 7. In Embodiment 5, the host computer is configured such that there is dedicated HW and the modules are directly connected. In the present embodiment, the host computer is configured such that the modules are connected to a bus, and the video decoding function and the video encoding function are performed by the CPU. In FIG. 12, the selector function described in Embodiment 5 is not provided, and thus the CPU 807 performs position/orientation estimation by controlling the flow of data. Control flow performed at this time will be described with reference to FIG. 13. FIG. 13 is a flowchart illustrating a position/orientation estimation method according to Embodiment 7. FIG. 13 is different from FIG. 10 in that S10000 is replaced by S13000, and S10020 is replaced by S13020. The operations of the other steps are the same as those described with reference to FIG. 10.

In S13000, a state of whether or not the host computer has received an analysis image is acquired. The operation of determining whether or not an analysis image has been received is performed per frame. In S13020, if it is determined that an analysis image has been received, S10030 is performed. Otherwise, S10040 is performed. These operations are performed while images are sequentially captured and processed, and thus this determination based on the conditions is also made per frame image. Even with the configuration described in the present embodiment, the same effects as those of Embodiment 5 can be obtained.

The head mounted display described above as an example of the MR apparatus is a video-see-through type head mounted display that displays a synthesized image obtained by superimposing a CG object on a captured image on the display unit so as to allow the user to view the synthesized image. However, as the head mounted display described in this specification, it is also possible to use an optical see-through type head mounted display that superimposes and displays a CG object on a display through which a user can view the reality space.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-177095, filed Sep. 8, 2015, and 2016-167289, filed Aug. 29, 2016, which are hereby incorporated by reference herein in their entirety.

What is claimed is:

1. An image synthesizing apparatus comprising:
one or more processors; and
a memory coupled to the one or more processors, the memory having stored thereon instructions which, when executed by the one or more processors, cause the image synthesizing apparatus to:
receive a first image from an image processing apparatus, the first image having been obtained using a first image sensor;
receive a second image from the image processing apparatus, the second image having been obtained using a second image sensor, wherein (a) the second image has a larger amount of image deterioration caused by a motion of the object than the first image, (b) a resolution of the second image is higher than that of the first image, and (c) both the first image sensor and the second image sensor are attached to the image processing apparatus;
analyze the first image and generate position and orientation information of the image processing apparatus based on the analyzed first image;
render a computer graphic (CG) object on the second image such that the CG object is superimposed at a position determined based on the position and orientation information generated based on the analyzed first image;
determine whether a predetermined condition is satisfied, and in response to determining that the predetermined condition is satisfied: (a) analyze the second image and generate position and orientation information of the image processing apparatus based on the analyzed second image; and (b) render a computer graphic (CG) object on the second image such that the CG object is superimposed at a position determined based on the position and orientation information generated based on the analyzed second image; and
determine a state of reception of the first image,
wherein the image synthesizing apparatus analyzes the first image and generates the position and orientation information while receiving the first image, and analyzes the second image and generates the position and orientation information while not receiving the first image.

2. An image processing system comprising an image processing apparatus and an image synthesizing apparatus, the image processing apparatus comprising:
one or more processors; and
a memory coupled to the one or more processors, the memory having stored thereon instructions which, when executed by the one or more processors, cause the image processing apparatus to:
output a first image from a first image sensor;
output a second image from a second image sensor, wherein (a) the second image has a larger amount of image deterioration caused by a motion of the object than the first image, (b) a resolution of the second image is higher than that of the first image, and (c) both the first image sensor and the second image sensor are attached to the image processing apparatus; and
transmit the first image and the second image to the image synthesizing apparatus, and
the image synthesizing apparatus comprising:
one or more processors; and
a memory coupled to the one or more processors, the memory having stored thereon instructions which, when executed by the one or more processors, cause the image synthesizing apparatus to:
receive the first image from the image processing apparatus;
receive the second image from the image processing apparatus;
analyze the first image and generate position and orientation information of the image processing apparatus based on the analyzed first image;
render a computer graphic (CG) object on the second image such that the CG object is superimposed at a position determined based on the position and orientation information generated based on the analyzed first image; and
determine whether a predetermined condition is satisfied, and in response to determining that the predetermined condition is satisfied: (a) analyze the second image and generate position and orientation information of the image processing apparatus based on the analyzed second image; and (b) render a computer graphic (CG) object on the second image such that the CG object is superimposed at a position determined based on the position and orientation information generated based on the analyzed second image,
wherein the image processing apparatus transmits both the first image and the second image while a motion of the image processing apparatus is greater than or equal to a predetermined threshold, and transmits the second image without transmitting the first image while the motion of the image processing apparatus is smaller than the predetermined threshold.

3. The image processing system according to claim 2, wherein the image processing apparatus transmits both the first image and the second image while a second predetermined condition is satisfied, and transmits the second image without transmitting the first image while the second predetermined condition is not satisfied.

* * * * *